United States Patent [19]
Clark

[11] Patent Number: 5,255,171
[45] Date of Patent: Oct. 19, 1993

[54] COLORED LIGHT SOURCE PROVIDING INTENSIFICATION OF INITIAL SOURCE ILLUMINATION

[76] Inventor: L. Douglas Clark, 15 Conrad St., San Francisco, Calif. 94131

[21] Appl. No.: 799,117

[22] Filed: Nov. 27, 1991

[51] Int. Cl.$^5$ .......................... F21V 7/00; G03B 27/54
[52] U.S. Cl. .................... 362/231; 362/800; 355/228; 355/70
[58] Field of Search .......... 362/240, 800, 231; 355/228, 229, 70

[56] References Cited

U.S. PATENT DOCUMENTS

| | | | |
|---|---|---|---|
| 3,760,174 | 9/1973 | Boenning et al. | 355/70 X |
| 3,923,394 | 12/1975 | Frankiewkz | 355/70 X |
| 4,013,915 | 3/1977 | Dufft | 313/499 |
| 4,255,042 | 3/1981 | Armitage, Jr. et al. | 355/3 |
| 4,826,269 | 5/1989 | Streifer et al. | 362/800 |
| 4,963,933 | 10/1990 | Brownlee | 355/218 |
| 5,001,609 | 3/1991 | Gardner et al. | 362/32 |
| 5,032,960 | 7/1991 | Katoh | 355/70 X |

OTHER PUBLICATIONS

Roland Winston, *Scientific American*, "Nonimaging Optics", Mar. 1991.

*Primary Examiner*—Richard R. Cole
*Attorney, Agent, or Firm*—D. Pressman

[57] ABSTRACT

A light concentrator, preferably for use with a color optical scanning device includes a reflector (34) with parabolic reflecting walls (36). Green LEDs (22), red LEDs (24), and blue LEDs (26) are situated at the base of the reflector (34) and a diffuser (30) is attached to the opposite end thereof. An electric switch (32) controls the LED array. When an input page is scanned, the switch (32) activates one type of LEDs at a time. The reflector (34) concentrates the emitted light at the surface of the diffuser (30). The photodetector array of the xerographic device receives three monochromatic images which are then superimposed to provide a color image.

19 Claims, 5 Drawing Sheets

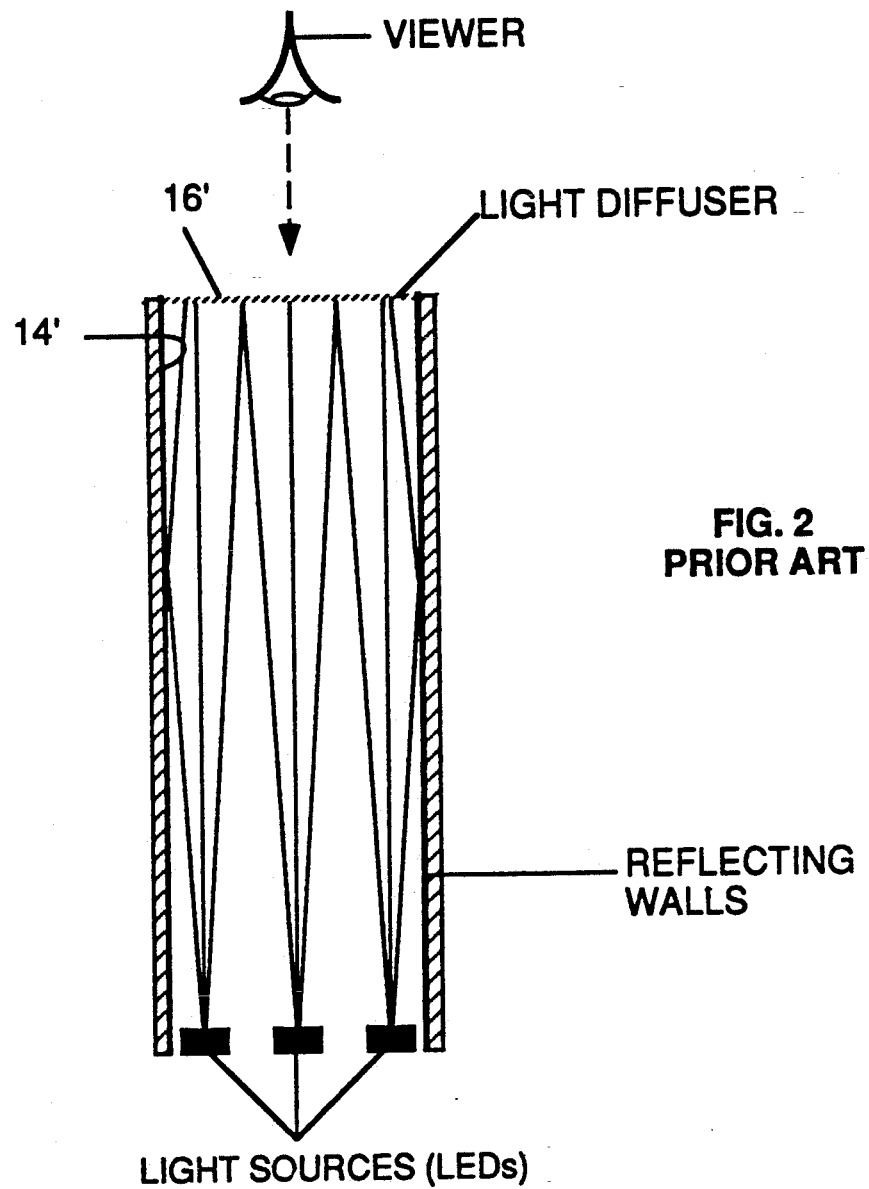

COLORED LIGHT SOURCE PROVIDING INTENSIFICATION OF INITIAL SOURCE ILLUMINATION

BACKGROUND

1. Field of Invention

The present invention relates to light sources and concentrators, specifically to light sources that provide concentrated light of various colors, especially for optical scanning systems. Such optical scanning systems include, but are not limited to xerographic devices, line scan imaging systems, and area scan imaging systems. Common embodiments of these scanners include computer-input and flat-bed page scanners, such as the model HP9195A manufactured by Hewlett Packard Company of Palo Alto, Calif. U.S.A. and sold under the trademark "Scan Jet Plus".

2. Description of Prior Art

It is desirable to obtain the highest possible concentration of light, for instance, in illumination systems of optical scanners in order to maximize the dynamic range of such devices.

Prior art illuminators are shown in U.S. Pat. Nos. 4,013,915 to W. H. Duft (1977), 4,225,042 to J. D. Armitage (1981), 4,963,933 to Kenneth Brownlee (1990), and 5,001,609 to Robert Gardner et al. (1991). These illuminators are of the types depicted in FIGS. 1 and 2.

The illuminator shown in FIG. 1 uses a light source 10, which comprises several individual sources positioned at the base of a reflector 12. Reflector 12 has reflecting walls 14 which diverge outwardly. The cross section of this prior-art illuminator has a salient geometric shape such as conical (not shown), or it may extend any length perpendicular to its cross section. A diffuser 16 is located at the diverging end of reflector 12. As light is emitted by source 10, it will spread out. Some will proceed directly to diffuser 16, spreading out slightly as indicated, and some will be reflected from walls 14, as also indicated. As a result, most of the light emitted by source 10 will shine through diffuser 16 and the surface of diffuser 16 will appear to be uniformly illuminated.

However, the illumination intensity at the surface of diffuser 16 is much less than that of source 10 since light is dispersed from the relatively small surface of source 10 to cover the much larger area of diffuser 16.

FIG. 2 shows a modification of the illuminator of FIG. 1. In this case, reflecting walls 14' are parallel to each other, so that the light source and the diffuser areas are equal. Here, the light intensity at the surface of the diffuser, here designated 16', is somewhat greater than the light intensity at the surface of diffuser 16 of FIG. 1, but is still less than the intensity of the light source.

The main drawback of the above devices is their inability to concentrate radiation emitted by the light source. Moreover, to use these illuminators in a color scanning device, where different colors must be emitted at different times, one must employ mechanically operated color filters (not shown), which would add complexity to the apparatus. Furthermore, since the switching from one color to the next is done mechanically, the speed of the scanning process decreases.

Non-patent literature also discusses the subject of nonimaging light concentrators. As stated in the article "Nonimaging Optics" by R. Winston (*Scientific American*, March 1991), nonimaging concentrators intensify light flux much better than do lenses. According to the article, an optical device that concentrates light by forming an image will blur that image away from the focal point. Consequently, a maximum concentration of light can be attained only when the image-forming requirements are disregarded. In his experiments, Winston uses a solar energy concentrator, which is essentially a funnel. Light entering the large side of the funnel is reflected from the walls of the funnel so that most of it passes out through the small side of the funnel, thus destroying any imaging order (image) present in the light source. However, if only concentration of light is desired, there is no need for image formation.

The article also describes a solar concentrator having hyperbolic walls. Such a device is useful when light must be concentrated on a flat surface. While this device is able to concentrate light, it lacks any capability for use in color copiers or scanners, where concentrated light of various colors must be supplied at respectively different times.

OBJECTS AND ADVANTAGES

It is accordingly an object of the invention to provide a light concentrator which overcomes the foregoing disadvantages, which can be used to supply concentrated light of different colors at respective different times or simultaneously, which enhances the image quality of color monochrome scanning, which increases the speed of the image input scanning process, and which eliminates mechanical complexity. Further objects and advantages will become apparent after consideration of the ensuing description and the accompanying drawings.

DRAWING FIGURES

FIG. 2 is a schematic drawing of a prior-art illuminator having parallel sides.

FIG. 3b is a cross-section of the concentrator of FIG. 3a taken in the direction indicated by lines 3a—3a.

Figure 1:
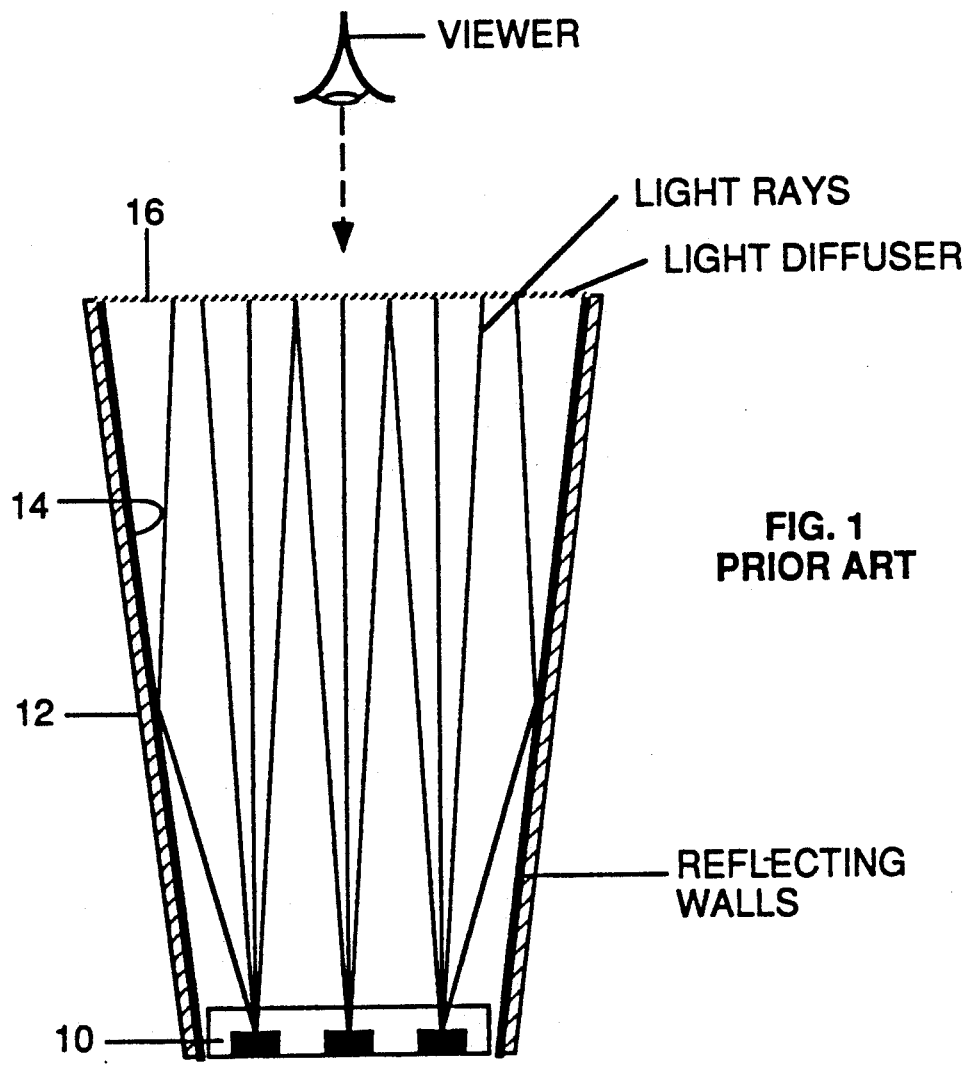
FIG. 1 is a schematic diagram of a prior-art illuminator having diverging sides.

It is to be noted that for purposes of illustration, these figures are not necessarily drawn to scale.

REFERENCE NUMERALS USED IN THE DRAWINGS AND DESCRIPTION

10—light source
12—reflector
14, 14'—reflecting walls
16, 16', 30—diffusers
18—conical reflector
18'—opposing, converging, planar side walls
20—converging reflecting walls
22—green LEDs
24—red LEDs
26—blue LEDs 28—base of reflector
30'—rectangular diffuser
32—electronic switch
34—hyperbolic reflector
36—hyperbolic reflecting walls
40—solid, transparent or translucent light guide

DESCRIPTION—FIGS. 3, 4, AND 5

Figure 3A:
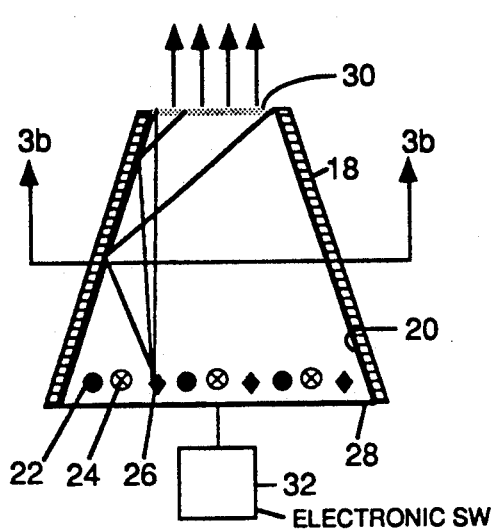
FIG. 3a is a schematic cross-sectional drawing of a conical light concentrator according to the present invention.
Figure 3B:
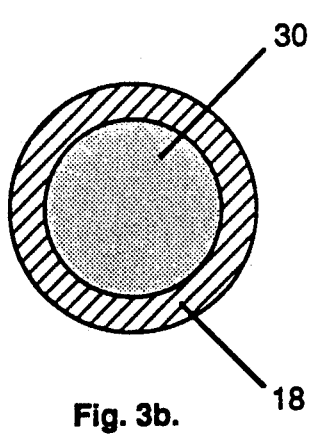

A schematic diagram of a light concentrator according to a preferred embodiment of the present invention is shown in FIGS. 3a and 3b.

The light concentrator preferably is mounted into the scanning system of a xerographic, line-scan, or area-scan imaging device (not shown). Such an imaging device illuminates and scans a copy to convert the information on the copy to an electronic signal or an optical image, and uses the signal or image to make a duplicate copy, provide a signal for analysis, transmission, etc. It includes a linear or conical reflector 18 having converging, straight-sided reflecting walls 20. Green light-emitting diodes (LEDs) 22 (shown as filled circles), red LEDs 24 (an "X" enclosed within a circle), and blue LEDs 26 (diamonds) are situated at and distributed over the area of a base 28 of reflector 18. A diffuser 30 is attached to the opposite end of reflector 18. LEDs 22, 24, and 26 are wired into an electronic switch 32.

Figure 4A:
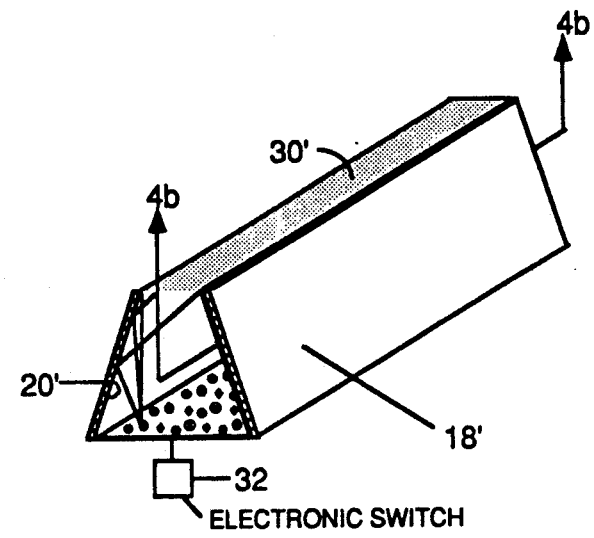
FIG. 4a is a perspective view of a trapezoidal concentrator according to the invention and FIG. 4b is a sectional view taken in the direction indicated by lines 4b—4b.
Figure 4B:
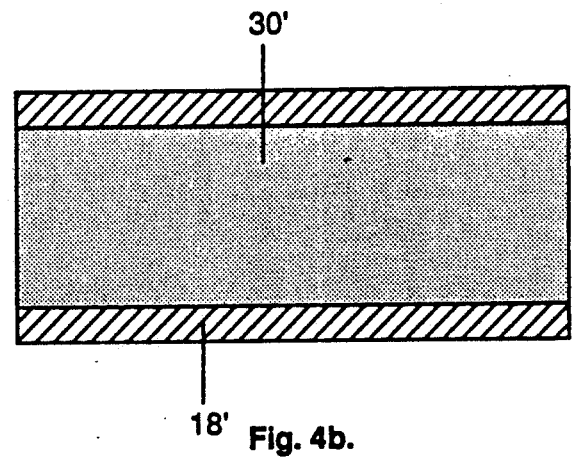

FIGS. 4a and 4b show a similar concentrator, but with a trapezoidal configuration (opposing, converging, planar side walls 18') and a rectangular diffuser 30'. The ends are closed by trapezoidal end walls (not shown).

Figure 5:
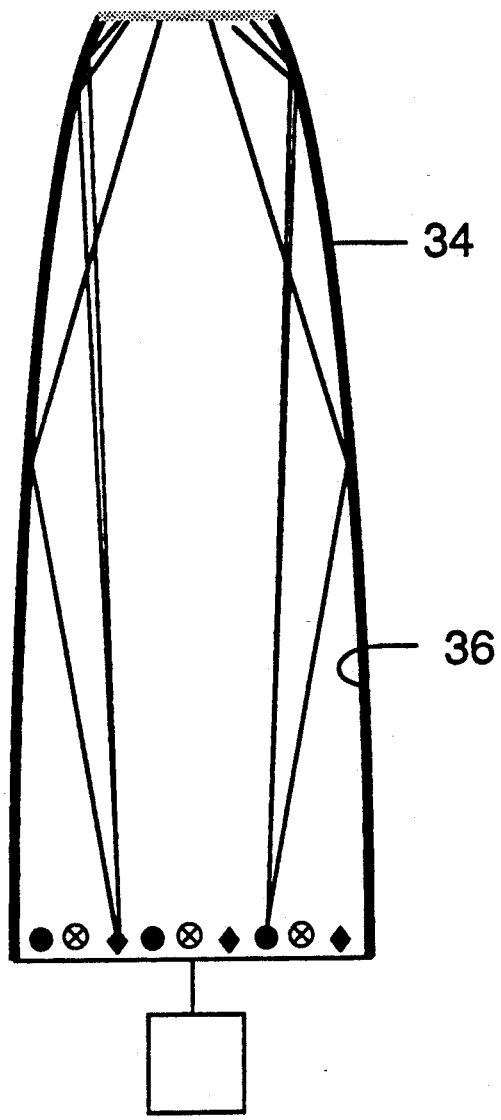
FIG. 5 is a schematic drawing of a variation of the light concentrator shown in FIG. 3.
Figure 6:
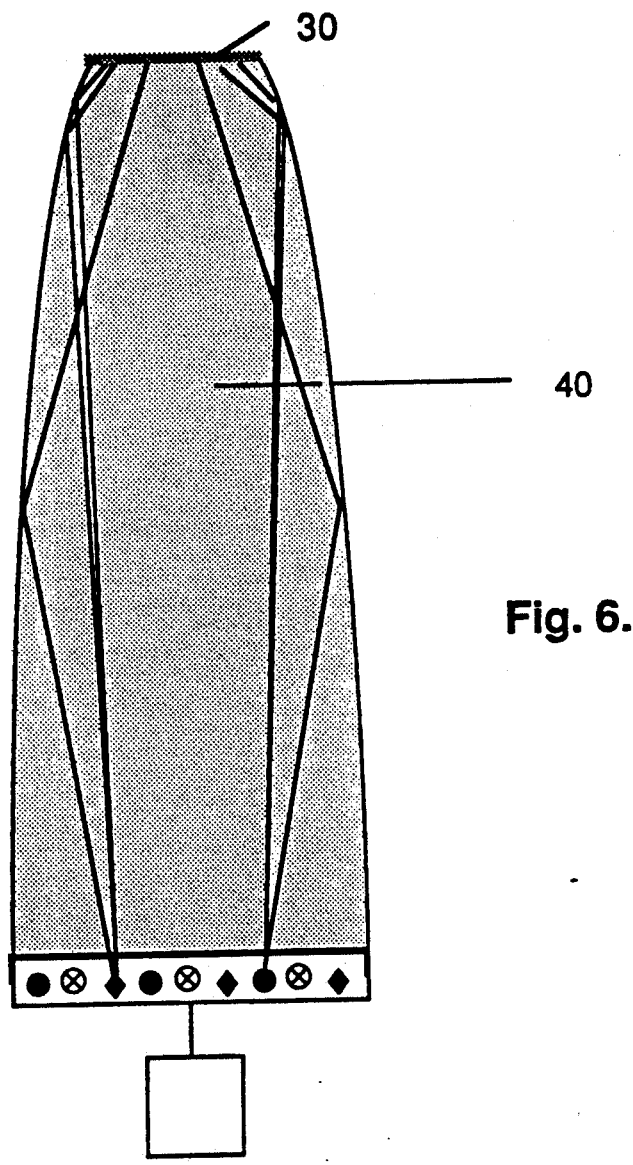
FIG. 6 is a schematic drawing of a variation of the light concentrator using a solid plastic or glass light guide.

A variation of the light concentrator of FIG. 3 is shown in FIG. 5, where conical reflector 18 is replaced with a parabolic reflector 34, having parabolic reflecting walls 36, as seen in the axial cross section of FIGS. 5 and 6. The shape of walls 36 is dictated by the requirement, shown in FIG. 5, that light rays entering the reflector cavity from the larger, diverging end will undergo only a single reflection prior to exiting the reflector cavity at the smaller, converging end. This concept is described in detail in Winston, supra.

In one specific version of the embodiment of FIG. 3, the light concentrator had an overall length of about 20 cm. The diameter at the base of the concentrator was approximately 25 cm and the diameter of the diffuser was approximately 5 mm. LEDs 22, 24, and 26 at the base of the concentrator preferably are mounted on a printed circuit board in rows and columns where each row or column consists of repetitive triplets (red, green, blue, red, green, blue, etc.) with a density of 12 LEDs per centimeter squared. Each LED preferably has a rectangular shape (1.5 mm×3.0 mm), such as the BR1102W Type LED sold by Stanley Electric Co., Ltd., of Japan.

A further variation of the light concentrator depicted in FIGS. 3, 4, and 5 is shown in FIG. 6. Rather than a hollow chamber with reflecting sides, a solid, transparent or translucent, plastic or glass light guide 40 is used. Preferably, guide 40 is made up of solid, transparent acrylic plastic. Guide 40 has approximately the same shape as reflectors 12 and 34. Instead of an internal reflecting surface, guide 40 employs the principle of "total internal reflection". Because of the difference in the index of refraction of the plastic or glass material and air, the walls of guide 40 appear highly reflective to light emitted by the LEDs and traveling upward through the solid material of the guide. In some cases, where total internal reflection is not realized because the shape of the hyperbola does not permit total internal reflection, the outside of guide 40 may be painted with a reflecting paint, or a coating which promotes total internal reflection. Diffuser 30, if employed, may comprise an additional piece of frosted plastic, applied to the top surface of guide 40. Alternatively, a diffusing surface may be created by roughening the top, light exiting surface of guide 40. These concepts are well known to those skilled in the art of optics.

OPERATION—FIGS. 3, 4, AND 5

As stated, the light concentrator shown in FIG. 3 may be used in a scanning system (not shown) of a xerographic, line scan, or area-scan imaging device (not shown) which provides a color image of the input page by scanning it three times. Every time the input page or copy is scanned, electronic switch 32 turns on one group of LEDs (22, 24, or 26), activating only one primary color, i.e., one color of LED, per scan. If desired, switch 32 can be programmed to activate the LEDs in a way (well known to those skilled in the art) that a mixture of primary colors is produced, so as to provide white or colored light of variable hues for other imaging applications, not discussed in detail.

Reflector 20 concentrates light emitted by the LEDs at the surface of diffuser 30. The light from diffuser 30 illuminates and scans a page or film negative (not shown) in a well-known fashion. From there it is reflected or transmitted to a photodetector array (not shown). The photodetector array receives three monochromatic images which are later superimposed, in a manner familiar to those skilled in the art, to provide a full-color image.

SUMMARY, RAMIFICATIONS, AND SCOPE

Thus, it has been shown that the illuminator provides a light concentrator for xerographic devices, line-scan, and area-scan imaging systems. It is able to produce concentrated light of any primary color, or concentrated light of any mixture of colors, including white light, cheaply, reliably, and simply, without the need for mechanical filters or mechanisms. It can enhance the image quality of the aforementioned devices. It also increases the speed of the scanning process and eliminates mechanical complexity, weight, etc.

Although the light concentrator has been shown and described in the form of a specific embodiment, its parts, materials, and configurations are given only as examples, and many other modifications of the light concentrator are possible. For example, the shape of the reflector element may vary and can include cones and parabolas of various shape. Switching means 32 can be replaced by a mechanical switch or distributor. The LEDs may be replaced with different light sources, such as incandescent filaments with color filters, fluorescent lamps, cathode ray tubes, electro-luminescent phosphor lamps, etc. It is possible to utilize more or less than three colors of LEDs, as well as other colors besides red, green, and blue. The diffuser can be made of frosted tape, plastic, or smoked glass, and can be useful for other purposes besides scanning, e.g., xerography. In some cases, the diffuser may be removed or replaced by a "clear" diffuser to permit direct illumination of an adjacent surface. Therefore, the scope of the invention should be determined not by the examples given, but by the appended claims and their legal equivalents.

What I claim is:

1. A light concentrator for an optical scanning input device, comprising:

concentrator means having a relatively large, diverging end, a relatively small converging end, and an enclosing wall joining said relatively large, diverging end with said relatively small converging end, said enclosing wall having an inner surface, and a plurality of light sources arranged to supply a plurality of respective colors of light, said plurality of light sources being positioned adjacent said large, diverging end of said concentrator means so that light from said plurality of sources is directed into said large, diverging end, said concentrator means being hollow and having a substantially parabolic shape when seen in axial cross section such that (a) when said light is directed into said large, diverging end, it will be reflected only once from said inner surface of said enclosing wall and then emerge out of said converging end, and (b) the intensity of light at said large, diverging end.

2. The light concentrator of claim 1, further including translucent means for diffusing light emitted by said plurality of light sources, said translucent means being positioned at said converging end of said concentrator means.

3. The light concentrator of claim 2 wherein said translucent means is made of frosted plastic.

4. The light concentrator of claim 1 wherein said inside surfaces of said walls are coated with reflective material.

5. The light concentrator of claim 1 wherein said light sources comprise an array of light-emitting diodes.

6. The light concentrator of claim 5 wherein said light-emitting diodes consist of a plurality of light-emitting diodes for each of said colors.

7. The light concentrator of claim 6 wherein said colors are red, blue, and green.

8. The light concentrator of claim 1 wherein said switching means comprises an electronic switch.

9. The light concentrator of claim 8 wherein said electronic switch can turn on said light-emitting diodes one color at a time.

10. A light concentrator for an optical scanning input device, comprising:

concentrator means having a relatively large, diverging end, a relatively small converging end, and an enclosing wall joining said relatively large, diverging end with said relatively small converging end, said enclosing wall having an inner surface, a plurality of light sources arranged to supply a plurality of respective colors of light, said plurality of light sources being positioned adjacent said large, diverging end of said concentrator means so that light from said plurality of sources is directed into said large, diverging end, said concentrator means being hollow and having a substantially parabolic shape when seen in axial cross section such that (a) when said light is directed into said large, diverging end, it will be reflected only once from said inner surface of said enclosing wall and then emerge out of said converging end and (b) the intensity of light emerging from said small converging end is greater than the intensity of light at said large, diverging end, a light diffuser positioned at said converging end; and an electronic switch arranged to control said light sources.

11. The light concentrator of claim 10 wherein said concentrator means is hollow and said walls are coated on the inside with reflective material.

12. The light concentrator of claim 10 wherein said light source comprises an array of red, blue and green light-emitting diodes.

13. The light concentrator of claim 10 wherein said light diffuser comprises a sheet of a translucent material.

14. The light concentrator of claim 10 wherein said electronic switch can activate several colors of light-emitting diodes at the same time.

15. A light concentrator for an optical scanning input device, comprising:

concentrator means having a relatively large, diverging end, a relatively small converging end, and an enclosing wall joining said relatively large, diverging end with said relatively small converging end, said enclosing wall having a substantially parabolic shape when seen in axial cross section, and an inner surface, said walls being coated on the inside with reflective material;

an array of red, green, and blue light-emitting diodes positioned at said diverging end of said reflector;

a sheet of light diffusing material situated at said converging end of said reflector; and an electronic switch arranged to switch on or off said array of light-emitting diodes, said switch being able to activate one color of said light-emitting diodes at a time.

16. The light concentrator of claim 15 wherein said concentrator is hollow and said walls are coated on the inside with reflective material.

17. The light concentrator of claim 15 wherein said light source comprises an array of red, blue and green light-emitting diodes.

18. The light concentrator of claim 15, further including translucent means for diffusing light emitted by said plurality of light sources, said translucent means being positioned at said converging end of said concentrator means.

19. The light concentrator of claim 18 wherein said translucent means is made of frosted plastic.

* * * * *

UNITED STATES PATENT AND TRADEMARK OFFICE
CERTIFICATE OF CORRECTION

PATENT NO. : 5,255,171
DATED : October 19, 1993
INVENTOR(S) : Lloyd Douglas Clark It is certified that error appears in the above-indentified patent and that said Letters Patent is hereby corrected as shown below:

Column 5, lines 17-19, change to read as follows:

--enclosing wall and then emerge out of said converging end, and (b) the intensity of light emerging from said small converging end is greater than the intensity of light at said large, diverging end.--.

Signed and Sealed this

Fifth Day of April, 1994

Attest:

BRUCE LEHMAN

Attesting Officer  Commissioner of Patents and Trademarks